(12) United States Patent
Araki et al.

(10) Patent No.: US 7,778,623 B2
(45) Date of Patent: Aug. 17, 2010

(54) COMMUNICATION SYSTEM AND SERVER APPARATUS AND TERMINAL APPARATUS

(75) Inventors: Motohisa Araki, Akishima (JP);
Kenichi Kitazawa, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 702 days.

(21) Appl. No.: 11/710,775

(22) Filed: Feb. 26, 2007

(65) Prior Publication Data
US 2007/0202837 A1    Aug. 30, 2007

(30) Foreign Application Priority Data
Feb. 27, 2006    (JP)    ............................. 2006-050611

(51) Int. Cl.
*H04B 1/16*    (2006.01)
(52) U.S. Cl. .................................. 455/343.3
(58) Field of Classification Search ... 455/343.1–343.5, 455/574, 572, 127.1, 127.5, 38.3, 67.13; 340/539.3, 7.32, 855.8
See application file for complete search history.

(56) References Cited

U.S. PATENT DOCUMENTS

| 5,027,428 | A | * | 6/1991 | Ishiguro et al. ............. 340/7.35 |
| 5,832,366 | A | * | 11/1998 | Umetsu ...................... 340/7.38 |
| 6,353,747 | B1 | * | 3/2002 | Honda ........................ 455/561 |

| 2007/0112954 | A1 | * | 5/2007 | Ramani et al. .............. 709/224 |
| 2007/0178888 | A1 | * | 8/2007 | Alfano et al. ............. 455/414.1 |

FOREIGN PATENT DOCUMENTS

| JP | 2000-41037 | 2/2000 |
| JP | 2002-290550 | 10/2002 |
| JP | 2002-335290 | 11/2002 |
| JP | 2004-221706 A | 8/2004 |
| JP | 2005-217548 A | 8/2005 |

OTHER PUBLICATIONS

English translation of Japanese Office Action dated Aug. 5, 2008.

* cited by examiner

*Primary Examiner*—Melody Mehrpour
(74) *Attorney, Agent, or Firm*—Knobbe, Martens, Olson & Bear, LLP

(57) ABSTRACT

According to one embodiment, a communication system includes a first terminal to be connected to a first communication network, assigned a terminal ID and driven by power supplied from a battery, a server apparatus to be connected to a second communication network differing from the first network, to periodically confirm presences of the first terminal and a second terminal to be connected to the second communication network, and to communication-connect between the first and the second terminals in the case of presences thereof, and a controller which makes the server apparatus monitor that the first terminal is present on the first communication network by a second period longer than a first period monitoring that the second terminal is present on the second communication network.

12 Claims, 9 Drawing Sheets

FIG. 3

| Terminal identifier | Keep-alive signal transmission interval |
|---|---|
| 3000 | 20sec |
| 3001 | 5sec |
| 3002 | 40sec |
| 3003 | 0sec |
| 3004 | 20sec |
| ... | |

FIG. 4

| Terminal identifier | Battery remaining amount | Transmission interval (~25%) | Transmission interval (~50%) | Transmission interval (~75%) | Transmission interval (~100%) |
|---|---|---|---|---|---|
| 3000 | 65% | 60sec | 40sec | 20sec | 20sec |
| 3001 | 80% | 60sec | 60sec | 60sec | 60sec |
| 3002 | 40% | 60sec | 60sec | 20sec | 20sec |
| 3003 | 20% | 0sec | 0sec | 20sec | 20sec |
| ... | | | | | |

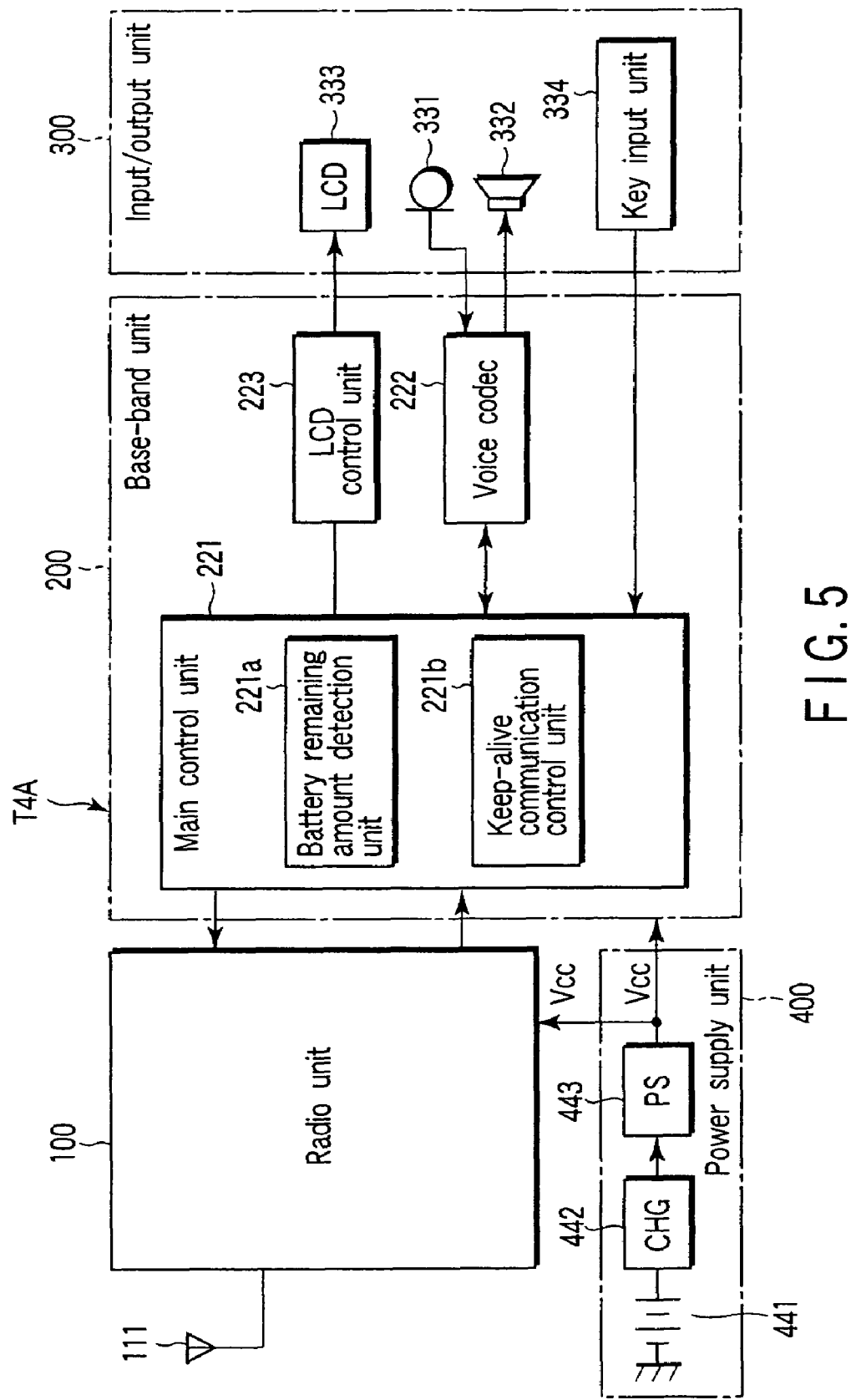
F I G. 5

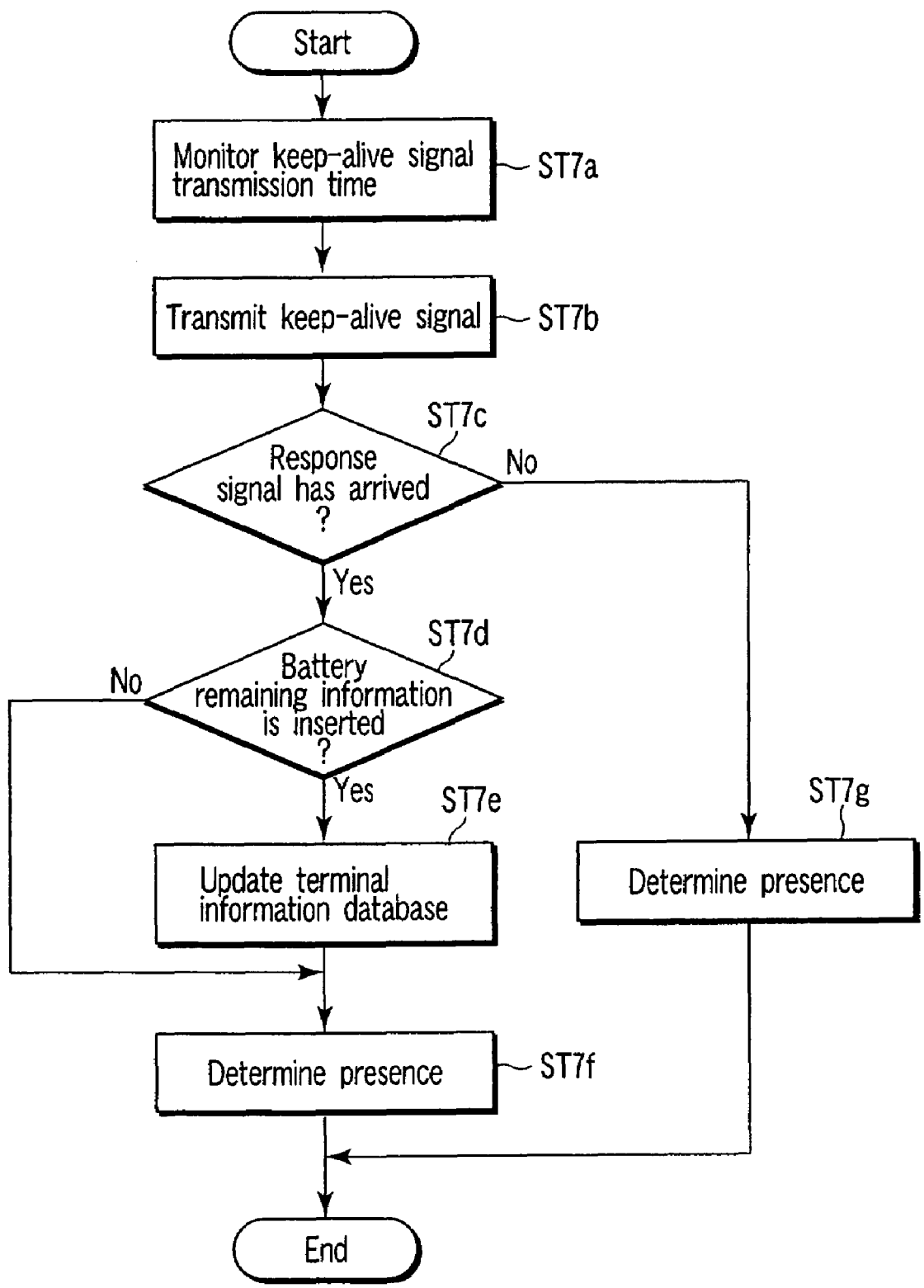
F I G. 7

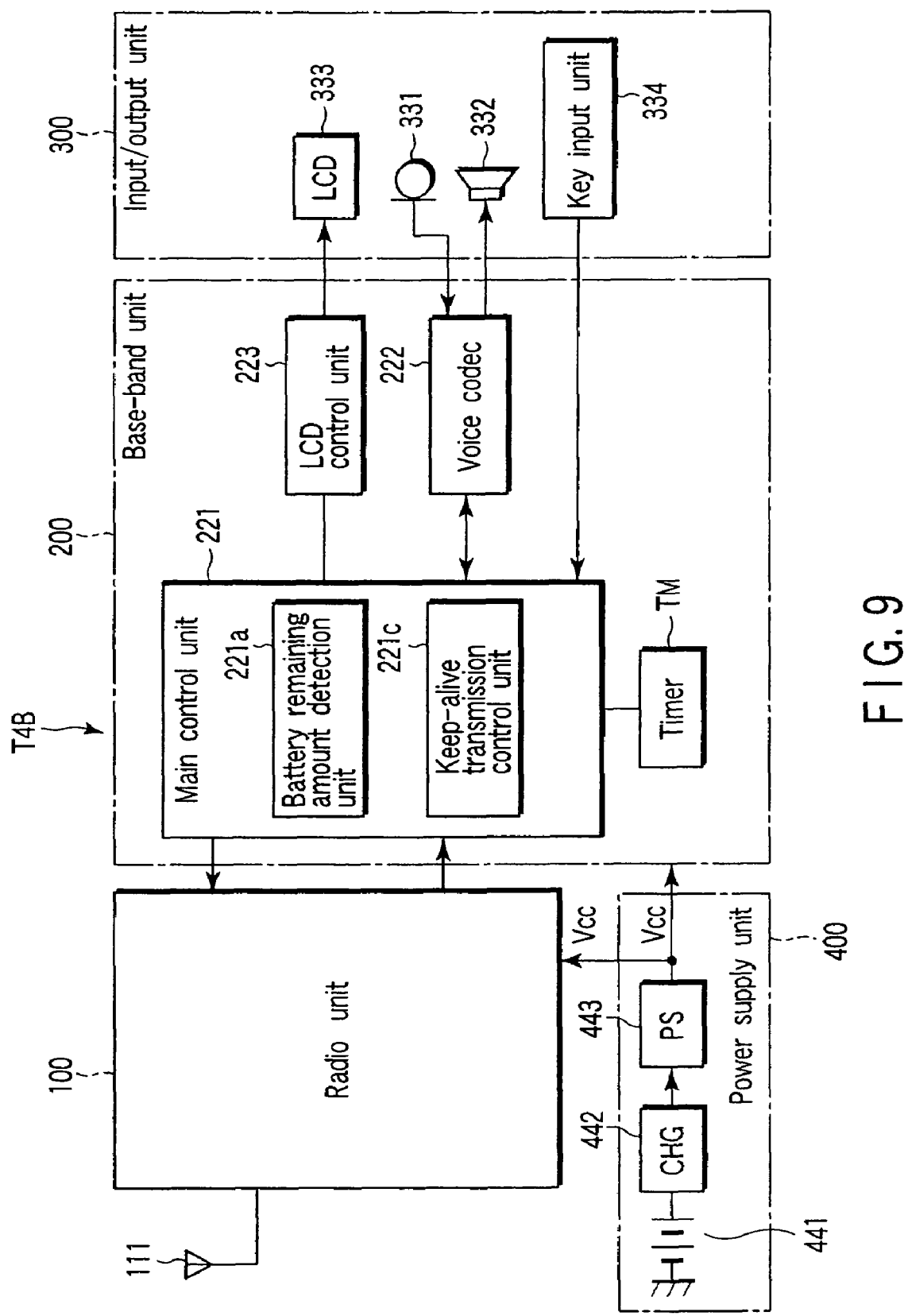
F I G. 9

COMMUNICATION SYSTEM AND SERVER APPARATUS AND TERMINAL APPARATUS

CROSS-REFERENCE TO RELATED APPLICATIONS

This application is based upon and claims the benefit of priority from Japanese Patent Application No. 2006-050611, filed Feb. 27, 2006, the entire contents of which are incorporated herein by reference.

BACKGROUND

1. Field

One embodiment of the invention relates to a system, such as an Internet Protocol (IP) telephone system, which makes voice communications among terminals via an IP network. More specifically, the present invention relates to a communication which determines normality and confirms presences of terminals connected to the IP network and driven by a battery, and to server apparatus and terminal apparatus.

2. Description of the Related Art

In recent years, a network telephone system (IP telephone system) which transmits/receives images and voices as interactive packet data in real time has begun to be widely used. Storing a plurality of IP telephone terminals in the IP network such as a local area network (LAN) and the Internet, and also connecting the IP network to a public network via a gateway to perform address conversions at the gateway, the IP telephone system permits multimedia information communications among the IP telephone terminals with one another, and among the IP telephone terminals and the public network.

In this case, before making communications, transmitting connection confirming signals such as keep-alive signals to each terminal and making the terminals send back their response signals result in performing the normality determinations and presence confirmations of the terminals. The foregoing IP telephone system transmits the connection confirming signals from the communication server even to the gate way to make the gateway send back its response signal then obtains the normality determinations and presence confirmations of the terminals (for instance, refer to Jpn. Pat. Appln. KOKAI Publication No. 2002-335290).

By the way, the aforementioned system allows multimedia information communications even among small-sized portable terminals and the IP telephone terminals. In such case, the system executes normality determinations and presence confirmations for the telephone terminals such as battery-driven terminals and IP telephone terminals under the same condition. In particular, in the battery-driven terminals, frequent times of execution of the normality determinations and presence confirmations of the terminals results in an increase in consumption power and causes a reduction in terminal waiting time.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary view illustrating one example of stored contents in a first table shown in FIG. 2;

FIG. 4 is an exemplary view illustrating one example of stored contents in a second table shown in FIG. 2;

FIG. 5 is an exemplary block diagram illustrating a functional configuration of a terminal shown in FIG. 1;

FIG. 7 is an exemplary flowchart illustrating a control processing procedure of the communication server in the firs embodiment;

FIG. 9 is an exemplary block diagram illustrating a functional configuration of a terminal regarding a second embodiment of the invention;

DETAILED DESCRIPTION

Various embodiments according to the invention will be described hereinafter with reference to the accompanying drawings, in general, according to one embodiment of the invention, a communication system comprising; a first terminal to be connected to a first communication network, assigned a terminal ID and driven by power supplied from a battery, a server apparatus to be connected to a second communication network differing from the first network, to periodically confirm presences of the first terminal and a second terminal to be connected to the second communication network, and to communication-connect between the first and the second terminals in the case of presences thereof; and a controller which makes the server apparatus monitor that the first terminal is present on the first communication network by a second period longer than a first period monitoring that the second terminal is present on the second communication network.

First Embodiment

Figure 1:
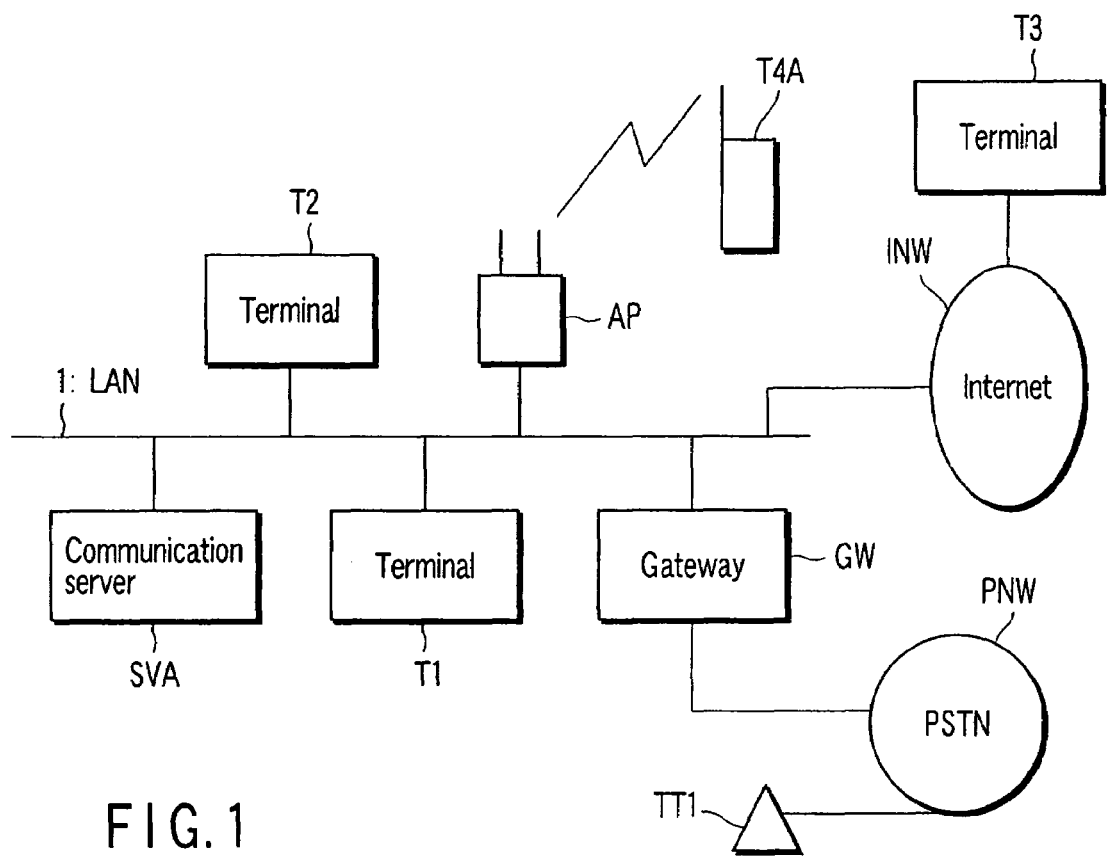
FIG. 1 is an exemplary schematic configuration view illustrating a communication system regarding a first embodiment of the invention.

FIG. 1 is a schematic configuration view showing a communication system regarding a first embodiment of the invention.

The system includes an Internet INW and a LAN I for a packet communication. Terminals T1 and T2 are connected to the LAN 1, and a terminal T3 is connected to the Internet INW. The terminals T1, T2 and T3 are IP telephone terminals each provided with a communication processing function and a media information function, or are software phones achieving the functions by means of software on personal computers.

A gateway GW is connected to the LAN 1. The gateway GW connects between the LAN 1 and a public network PNW and provided with a conversion function to and from a communication protocol and a signal format between the LAN 1 and the public network PNW. An external telephone terminal TT1 is connected to the public network PNW.

A terminal T4A is connected to the LAN 1 via an access point AP and a wireless LAN. The terminal T4A is a portable type telephone terminal connectable to the wireless LAN and driven by a battery.

Further, a communication server SVA is connected to the LAN 1. The communication server SVA has a conversion control function for the telephone terminals T1-T4A and the gateway GW.

Figure 2:
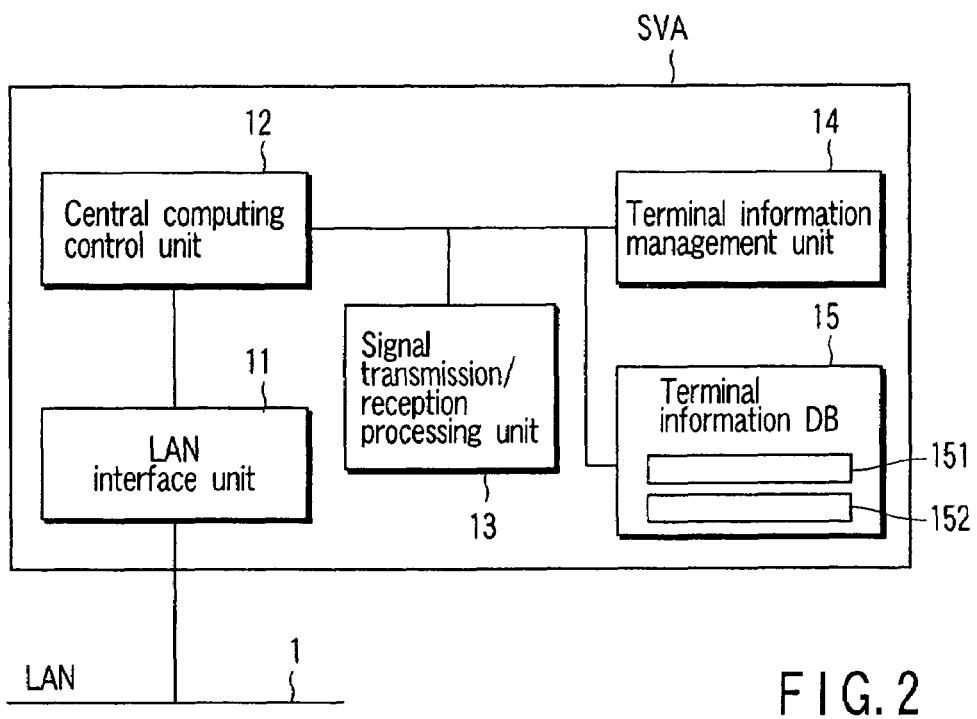
FIG. 2 is an exemplary block diagram illustrating a functional configuration of a communication server shown in FIG. 1.

By the way, the communication server SVA has the following functions as the functions regarding the present invention. FIG. 2 is a block diagram showing the configuration of the communication server SVA.

That is, the communication server SVA is provided with a LAN interface unit 11, a central computing control unit 12 (hereinafter, referred to as a control unit 12), a signal transmission/reception processing unit 13 (hereinafter, referred to as processing unit 13), a terminal information management unit 14 (hereinafter, referred to as a management unit 14), and a terminal information database 15 (hereinafter, referred to as a database 15). Among them, the LAN interface unit 11 conducts interface processing to and from the LAN 1.

The control unit 12 is configured with a CPU, ROM, RAM, etc., provided to control each unit of the communication server SVA through software processing.

The processing unit 13 transmits keep-alive signals to the terminals T1-T4A at keep-alive signal transmission intervals for each terminal T1-T4A managed by the management unit 14. The processing unit 13 then receives response signals transmitted from each terminal T1-T4A in response to the keep-alive signals.

The management unit 14 manages acquisition of information form the database 15, and the database 15 in response to a setting request for data and a data acquiring request for the data from the LAN 1, and manages the data relating to terminal information.

The database 15 includes a first table 151 and a second table 152. The first table 151 stores, as shown in FIG. 3, data indicating correspondence relationships among the terminal identifiers (terminal IDs) assigned to the terminals T1-T4A, respectively.

The second table 152 stores, as shown in FIG. 4, data, indicating correspondence relationships among each terminal ID of the terminals T1-T4, battery remaining amounts, and keep-alive signal transmission intervals for each battery remaining amount. The terminal IDs, the battery remaining amounts, and re-transmission intervals for each battery amount can be set by using the terminals T1-T4A or the personal computers connected to the LAN 1.

On the other hand, the terminal T4A has the following functions as the functions regarding the invention. FIG. 5 is a block diagram depicting the configuration of the terminal T4A.

The terminal T4A consists of a radio unit 100, a base-band unit 200, an input/output unit 300 and a power supply unit 400.

Radio signals arrived from the access point AP via the wireless LAN are received at an antenna 111 then performed prescribed signal processing by the radio unit 100 and supplied to the base-band unit 200.

The base-band unit 200 includes a main control unit 221, a voice codec 222 and an LCD control unit 223. The main control unit 221 identifies whether the output signal from the radio unit 100 is control data or voice data, and if it is the voice data, the main control unit 221 supplies it to the voice codec 222.

The voice data supplied to the voice codec 222 is voice-decoded, and the voice signal reproduced through the voice decoding is loudly output from a loudspeaker 332 of the input/output unit 300. An LCD 333 of the input/output unit 300 displays, a variety of items of information showing an operation state of its own terminal device being output from the main control unit 221 via the control unit 223 showing operation states of its own terminal, for example, also a telephone book, a reception electric field strength value, the remaining amount of the battery, etc.

A key input unit 334 is used for inputting a variety of operation instructions to the terminal T4A.

On the other hand, a transmission voice signal of a user output from a microphone 331 is supplied to the voice codec 222 of the base-band unit 200, voice-encoded there, then, supplied to the main control unit 221. The main control unit 221 multiplexes the encoded voice data with image data or control data in a prescribed format to supply the multiplexed transmission data to the antenna 111 via the radio unit 100, and transmits to the access point AP from the antenna 111.

The power supply unit 400 is provided with a battery 441, a charging circuit 442 to charge the battery 441, and a voltage generation circuit (PS) 443. The PS 443 generates a prescribed power supply voltage Vcc depending on the output voltage from the battery 441.

Now, the main control unit 221 includes a microprocessor, ROM and RAM, and comprises a battery remaining amount detection unit 221a (hereinafter, referred to as detection unit 221a) and a keep-alive communication control unit 221b (hereinafter, referred to as control unit 221b) in addition to a communication control function to conduct connection control for wireless LAN and communication control after establishing a communication link.

The detection unit 221a detects the remaining amount of the battery 441. The control unit 221b communicates the keep-alive signals to and from the communication server SVA via the wireless LAN, receives the keep-alive signal transmitted from the communication server, and also transmits a response signal, including remaining amount information of the battery 441 detected from the detection unit 221a in response to the keep-alive signal, to the communication server SVA.

Next to this, operations of the communication system configured in the foregoing manner will be described.

Figure 6:
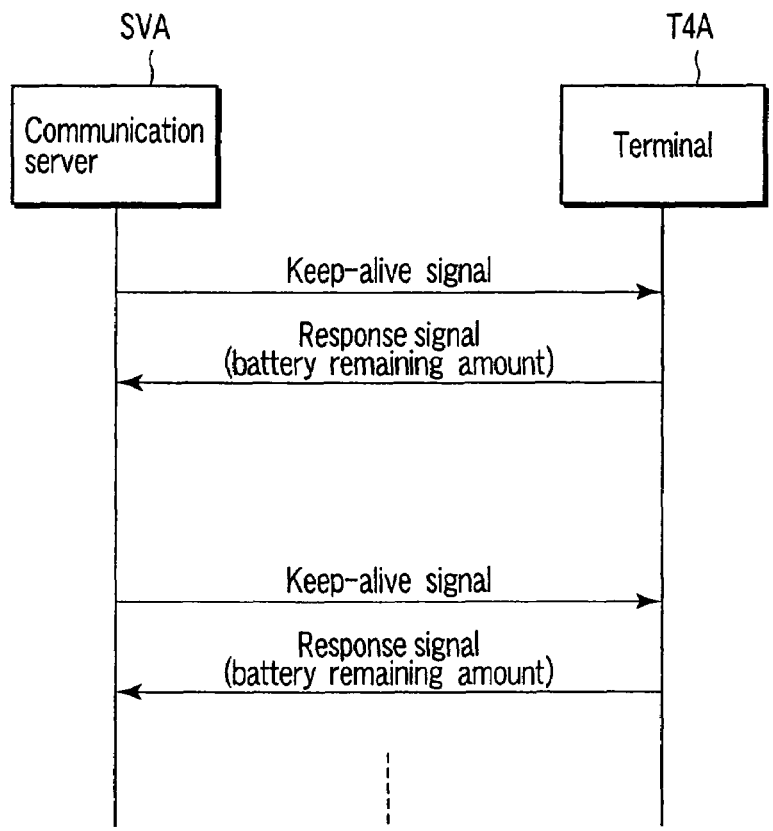
FIG. 6 is an exemplary sequence view of transmitting/receiving keep-alive signals between the communication server and the terminals in a first embodiment of the invention.

With transmitting/receiving the keep-alive signals among the communication server SVA and the terminals T1-T4A, as given above, the system grasps the states of the terminals T1-T4A. FIG. 6 is a sequence view of transmissions/receptions of the keep-alive signals.

At first, the communication system sets transmission intervals of the keep-alive signals for each terminal T1-T4A in advance on the communication server SVA. At this time, it is possible to set those values of the transmission intervals through the use of the terminals T1 and T2 connected to the LAN 1.

The transmission intervals of the keep-alive signals at each terminal T1-T4A are registered in the database 15 of the communication server SVA. On activating the terminals T1-T4A to start operations, the communication server SVA recognizes the terminals T1-T4A to execute control processing shown in FIG. 7 in accordance with the intervals which have set in the database 15.

The communication server SVA monitors whether the transmission time of the keep-alive signal for the terminal T4A has already elapsed or not (block ST7a), and when the transmission time has reached, the communication server SVA transmits the keep-alive signal to the terminal 4A via the LAN 1 and access point AP (block ST7b).

Figure 8:
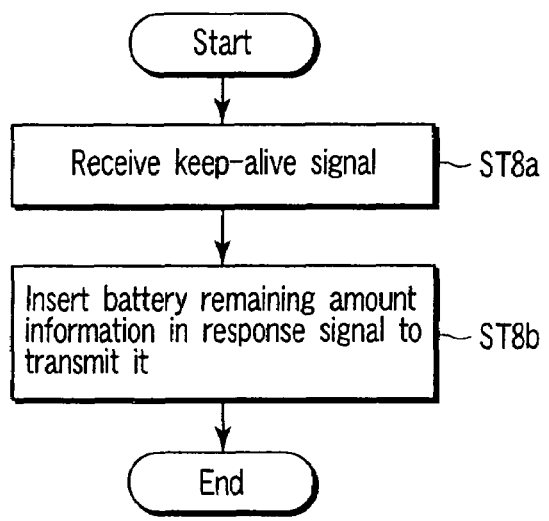
FIG. 8 is an exemplary flowchart illustrating a control processing procedure of the terminal in the first embodiment of the invention.

The terminal T4A executes control processing shown in FIG. 8. In operating, the terminal T4A receives to analyze the keep-alive signal transmitted from the communication server SVA (block ST8a), inserts the remaining amount information of the battery 441 into a response signal to the keep-alive signal, and transmits the response signal to the communication server SVA (block ST8b).

The communication server SVA monitors the arrival of the response signal from the terminal T4A (block ST7c). In this situation, if the response signal arrives from the terminal T4A (Yes, in block ST7c), the communication server SVA determines whether or not the remaining amount information of the battery 441 has been inserted in the response signal (block ST7d).

Here, if the remaining amount information has been inserted (Yes, in block ST7d), the communication server SVA referrers to the second table 152 in the database 15, updates the keep-alive signal transmission intervals corresponding to the terminal T4A in the first table 151 (block ST7e), then, determines the fact of presence of the terminal T4A (block ST7f).

On the contrary, if the remaining amount information of the battery 441 has not been inserted in the response signal (No, in block ST7d), the communication server SVA sifts to processing in block ST7f.

In block ST7c, if the terminal T4A does not transmit the response signal, even if a prescribed time has elapsed after transmitting the keep-alive signal (No, in block ST7c), the communication server SVA determines the fact of absence of the terminal T4A to remove the terminal T4A from the database 15 (block ST7g).

As given above, in the first embodiment, with using the remaining amount information of the battery 441 in the response signal sent back from the battery-driven terminal T4A, and with transmitting the keep-alive signals at the transmission intervals corresponding to the remaining amount, the communication server SVA performs the presence confirmation of the terminal T4A. Therefore, in comparison to the system of performing the presence confirmation of the terminal T4A in the same conditions as those of the terminals T1-T3, a process load on the terminal T4A is decreased, thereby, the consumption power for the terminal T4A can be reduced and the normality determination and presence confirmation thereof can be done without shortening the terminal waiting time.

In the first embodiment, with the existing signal such as a response signal for the keep-alive signal used, the terminal T4A notifies the remaining amount of the battery 441 to the communication server SVA from the terminal T4A, and the communication server SVA changes the transmission intervals of the keep-alive signals to the terminal T4A in response to the remaining amount. Therefore, there is no need to newly dispose a dedicated signal line for the remaining amount, thereby; it is possible to conduct an optimum normality determination and a presence confirmation for the terminal T4A in response to the remaining amount of the battery 441.

Moreover, in the first embodiment, in the communication server SVA, a change, etc., in transmission interval of the keep-alive signals corresponding to the communications with the terminal T4A and the remaining amount of the battery 441 being performed by using the information on the terminal T4A stored and managed in and by the database 15, an appropriate normality determination and presence confirmation can be implemented with a simple procedure.

Second Embodiment

FIG. 9 is a block diagram showing a functional constitution of a terminal T4B regarding a second embodiment of the invention. In FIG. 9, the components identical to those of FIG. 5 are designated with identical symbols and detailed descriptions thereof will be omitted.

The main control unit 221 is provided with a timer TM to time-count transmission intervals of keep-alive signals to the communication server SVB. The main control unit 221 has a keep-alive transmission control unit 221c (hereinafter, referred to as control unit 221c).

At the time when the timer TM counts a transmission time of the keep-alive signal, the control unit 221c changes the transmission time of the keep-alive signal by the timer TM in response to the remaining amount of the battery 441 detected by the detection unit 221a. At the time when the transmission time is elapsed, the control unit 221c transmits the keep-alive signal to the communication server SVB. In this case, it is presumed that the main control unit 221 has a database storing the same stored contents as those of the database 15 of the communication server SVB.

Figure 10:
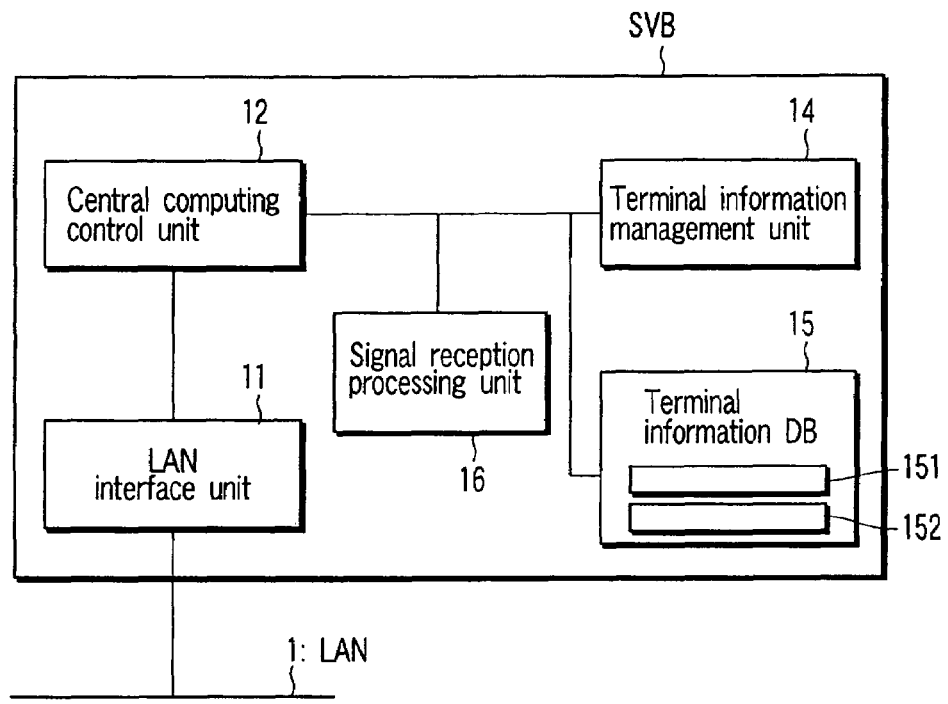
FIG. 10 is an exemplary block diagram illustrating a functional configuration of a communication server regarding the second embodiment of the invention.

The communication server SVB has the following functions. FIG. 10 is a block diagram showing the configuration. In FIG. 10, the components identical to those of FIG. 2 are designated with identical symbols and detailed descriptions thereof will be emitted.

The communication server SVB includes a signal reception processing unit 16 (hereinafter, referred to as processing unit 16) instead of the processing unit 13. The processing unit 16 receives a keep-alive signal transmitted from the terminal T4B.

Next, operations of the communication system configured in the way given above will be set forth.

Figure 11:
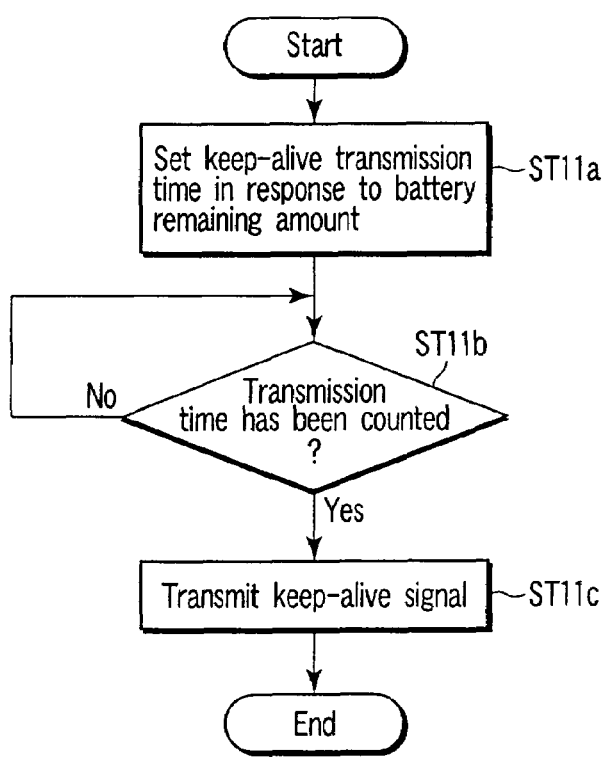
FIG. 11 is an exemplary flowchart illustrating a control processing procedure of the terminal in the second embodiment of the invention.

FIG. 11 is a flowchart indicating a control processing procedure of the terminal T4B. The terminal T4B firstly detects the remaining amount of the battery 441 to set the transmission time of the keep-alive signal to the timer TM in response to the remaining amount (block ST11a) then determines whether or not the timer TM counts the transmission time of the keep-alive signal (block ST11b).

Then, at the time when the timer TM counts the transmission time of the keep-alive signal, the terminal T4B transmits the keep-alive signal to the communication server SVB (block ST11c). It is supposed that the remaining amount information of the battery 441 has been inserted in the keep-alive signal.

Figure 12:
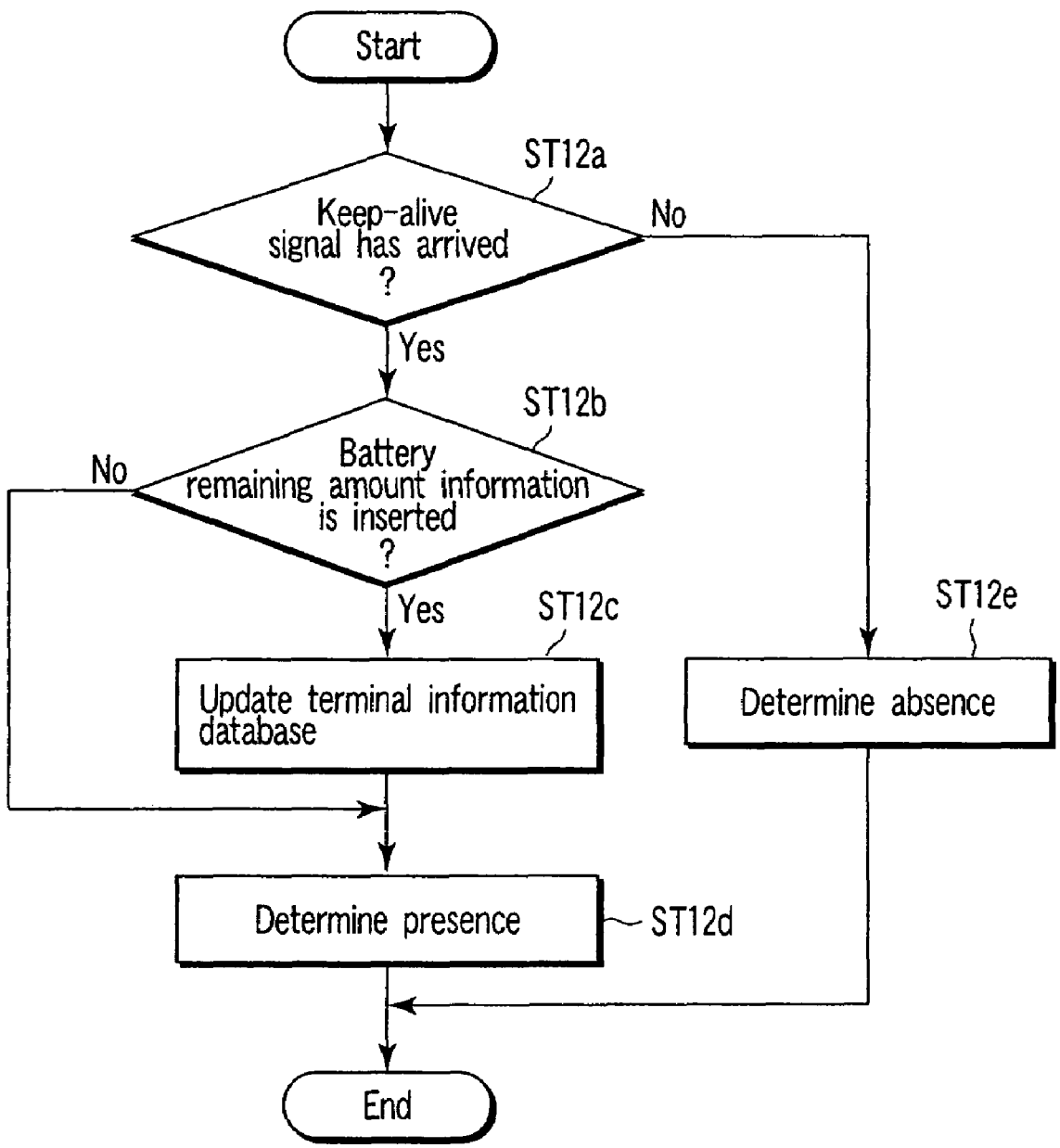
FIG. 12 is an exemplary flowchart illustrating a control processing procedure of the communication server in the second embodiment of the invention.

In regard to this, the communication server SVB executes control processing illustrated in FIG. 12.

The communication server SVB monitors the arrival of the keep-alive signal from the terminal T4B (block ST12a). In such a state, when the keep-alive signal from the terminal T4B reaches (Yes, in block ST12a), the communication server SVB determines whether or not the remaining amount information of the battery 441 has been inserted in the keep-alive signal (block ST12b).

Here, when the remaining amount information has been inserted there (Yes, in block ST12b), the communication server SVB refers to the second table 152 of the database 15 based on the corresponding remaining amount information to update the keep-alive signal transmission interval corresponding to the terminal T4B in the first table 151 (block ST12c), and determines the fact of presence of the terminal T4A (block ST12d).

On the contrary, when the remaining amount information of the battery 441 has not been inserted in the response signal (No, in block ST12b), the communication server SVB shifts to the processing in block ST12d.

In block 12a, if the keep-alive signal has not been transmitted from the terminal T4B after the lapse of a prescribed time period (No, in block ST12a), the communication server SVB determines the fact of absence of the terminal T4B to remove the terminal T4B from the database 15 (block ST12e).

As mentioned above, the second embodiment results in obtaining the similar operation effects to those of the first embodiment, and also the terminal T4B transmits the keep-alive signal in response to the remaining amount of the battery 441. Thereby, the communication system may decrease the processing load on the communication server SVB.

Third Embodiment

Figure 13:
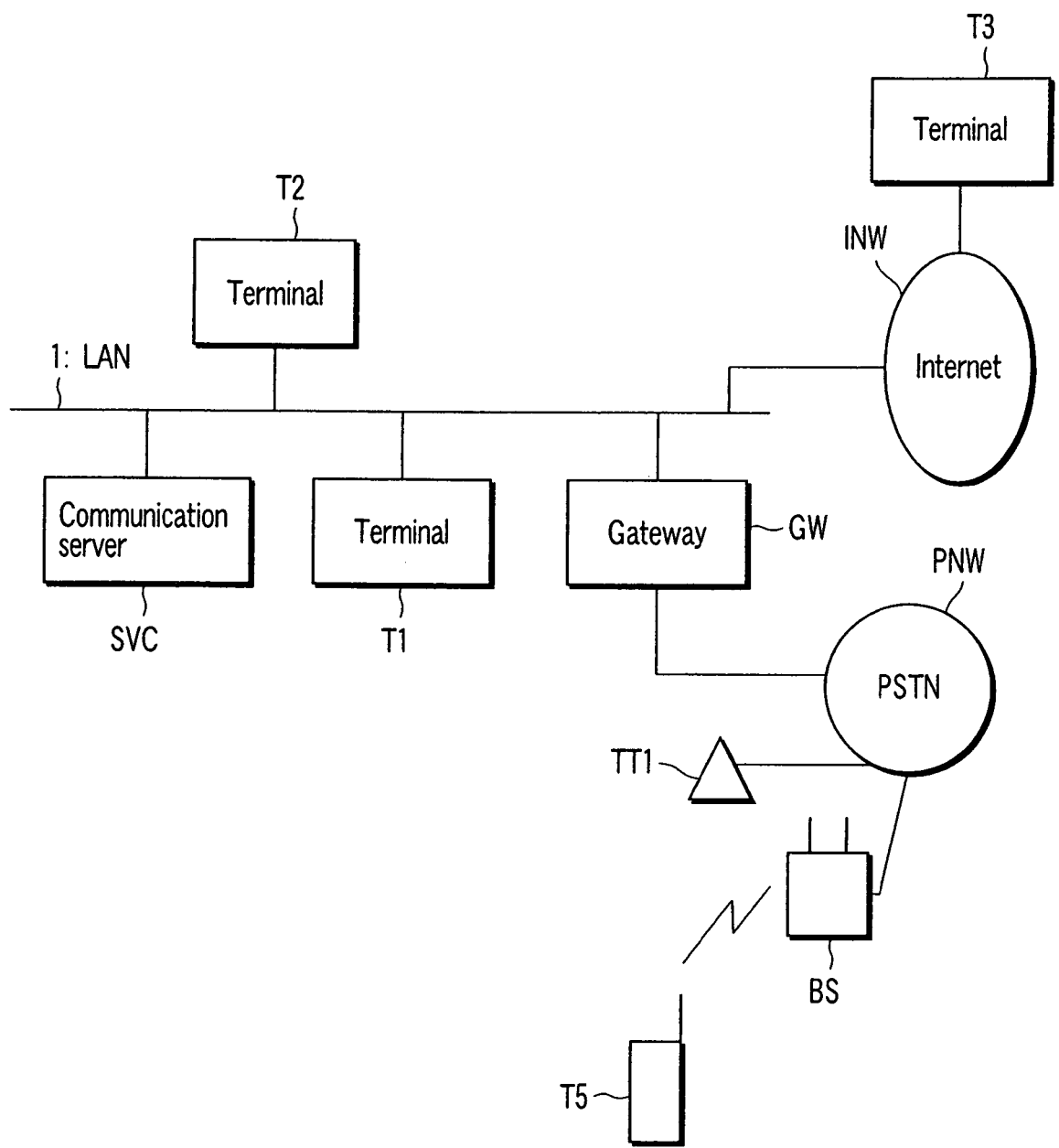
FIG. 13 is an exemplary schematic configuration view illustrating a communication system regarding a third embodiment of the invention.

FIG. 13 is a schematic configuration view illustrating a communication system in a third embodiment of the invention. In FIG. 13, the components identical to those in FIG. 1 are designated with identical symbols and detailed descriptions therefor will be omitted.

The communication system has a plurality of base stations BSs distributed and disposed in a service area. For the purpose of simplifying the descriptions, FIG. 13 depicts only one base station BS. The base station BS forms a radio area called a cell, and the base station BS is connected to a portable terminal T5 present in the radio area via a radio line. The base station BS is connected to the public network PNW. The base station BS is connected to the public network PNW. For the portable terminal T5, a battery-driven terminal such as a cellular phone and a personal digital assistant are used.

Transmitting/receiving the keep-alive signals among the terminals T1, T2, T3 and the portable terminal T5, the communication server SVC grasps the conditions thereof. Here, it is supposed that the transmission interval of the keep-alive signal for the portable terminal T5 is set to the interval longer than the transmission intervals of the keep-alive signals for the terminals T1, T2 and T3.

The communication server SVC monitors whether or not elapsed time reaches the transmission time of the keep-alive signal for the portable terminal T5. If the elapsed time has already reached the transmission time, the communication server SVC transmits the keep-alive signal to the portable terminal T5 through the LAN 1, gateway GW, public network PNW and base station BS.

Regarding to this transmission, the active portable terminal T5 receives to analyze the keep-alive signal transmitted from the communication server SVC, inserts the remaining amount information on the battery into the response signal to the keep-alive signal then transmits the response signal to the communication server SVC.

When the response signal arrived from the portable terminal T5, the communication server SVC then determines whether or not the remaining amount information of the battery has been inserted in the response signal. Here, if the remaining amount information has been inserted, the communication server SVC refers to the second table of the database 15 based on the relevant remaining information, updates the keep-alive signal transmission intervals corresponding to the portable terminal T5 in the first table 151 then determines the fact of the presence of the portable terminal T5.

As described above, according to the third embodiment, like the aforementioned first embodiment, the communication server SVC can transmits the keep-alive signals at transmission intervals corresponding to the remaining amount of the battery to implement the presence confirmation of the portable terminal T5 by utilizing the battery remaining amount information in the response signal to the keep-alive signal to be transmitted from the portable terminal T5 on the public network PNW.

Other Embodiments

The present invention is not limited to the aforementioned each embodiment. For instance, in each embodiment, having described an example, inserting the remaining amount information of the battery into the keep-alive signal or response signal to the communication server and transmitting it, the invention is not limited to this, and the keep-alive signal or response signal to the communication server may be transmitted to the communication server without having to inserting the remaining amount information of the battery therein. In this case, the transmission interval may be set so as to be longer than that of the not-battery-driven terminal and to be the extent not affecting the consumption power of the battery.

The foregoing each embodiment having described the telephone terminal as an example, battery-driven electronic equipment such as a game machine with a communication function mounted thereon may be useful.

The aforementioned each embodiment having described the use of the keep-alive signal for the presence confirmation of the terminal as an example, using a signal, for confirming the presence of the terminal, other than the keep-alive signal may be a possible approach.

In addition, even for a system constitution, a functional configuration of a communication server, a configuration of a terminal, a memory content in a terminal information database, a communication control procedure and its content of a keep-alive signal may be embodied in various forms without departing from the spirit or scope of the general inventive concept of this invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication system comprising:
    a first terminal configured to be connected to a first communication network, the first terminal being assigned a terminal ID and being driven by power supplied from a battery;
    a server apparatus configured to be connected to a second communication network that is different from the first communication network, the server apparatus being configured to periodically confirm the presence of the first terminal, to periodically confirm the presence of a second terminal that is configured to be connected to the second communication network, and to communicate with the first and the second terminals if they are present; and a controller configured to cause the server apparatus to monitor the presence of the first terminal on the first communication network according to a second period of time that is longer than a first period of time according to which the presence of the second terminal on the second communication network is monitored.

2. The communication system according to claim 1, wherein the controller is configured to transmit signals to the first terminal at intervals of the second period of time to cause the first terminal to send back its a response signal, and to determine the presence of the first terminal on the first communication network when the response signal is sent back.

3. The communication system according to claim 1, wherein the controller is configured to transmit signals to the first terminal at intervals of the second period, and to determine the presence of the first terminal is on the first communication network when the signals are received.

4. A communication system comprising:
a first terminal to be connected to a first communication network, assigned a terminal ID and driven by power supplied from a battery;
a server apparatus to be connected to a second communication network differing from the first network, to periodically confirm presences of the first terminal and a second terminal to be connected to the second communication network, and to communication-connect between the first and the second terminals in the case of presences thereof; and
a controller which makes the server apparatus monitor that the first terminal is present on the first communication network by a second period longer than a first period monitoring that the second terminal is present on the second communication network,
wherein the controller makes the first terminal detect the remaining amount of the battery, inserts remaining amount information of the battery into a transmission signal to the server apparatus and transmit the information, and changes the second period in response to the remaining amount information, if the remaining amount information of the battery is inserted in the transmission signal when the server apparatus receives the signal from the first terminal.

5. The communication system according to claim 4, further comprising:
a memory which stores a table in which a terminal ID of the first terminal and information showing the second period are associated with each other, wherein
the controller refers to the table, monitors the presence of the first terminal on the first communication network based on the reference result, and updates information showing the corresponding second period in the table based on the remaining amount information when a signal with the remaining amount information of the battery inserted therein is transmitted from the first terminal.

6. A communication system comprising:
a first terminal to be connected to a first communication network, assigned a terminal ID and driven by power supplied from a battery;
a server apparatus to be connected to a second communication network differing from the first network, to periodically confirm presences of the first terminal and a second terminal to be connected to the second communication network, and to communication-connect between the first and the second terminals in the case of presences thereof; and
a controller which makes the server apparatus monitor that the first terminal is present on the first communication network by a second period longer than a first period monitoring that the second terminal is present on the second communication network,
wherein the first communication network is a mobile communication network, and wherein the server apparatus receives a signal from the first terminal via the mobile communication network.

7. A server apparatus which is configured to periodically confirm the presence of a first terminal that is configured to be connected to a first communication network, wherein the first terminal is assigned a terminal ID and is driven by power supplied from a battery, and wherein the server apparatus is further configured to periodically confirm the presence of a second terminal that is configured to be connected to a second communication network that is different from the first network, and wherein the server apparatus is configured to communicate with the first and the second terminals if they are present, the server apparatus comprising:
a controller configured to monitor the presence of the first terminal on the first communication network according to a second period of time that is longer than a first period of time according to which the presence of the second terminal on the second communication network is monitored.

8. A terminal apparatus as a first terminal configured to be connected to a server apparatus that is configured to periodically confirm the presence of the first terminal on a first communication network, wherein the first terminal is assigned a terminal ID and is driven by power supplied from a battery, and wherein the server is configured to periodically confirm the presence of a second terminal that is configured to be connected to a second communication network that is different from the first network, and wherein the server is configured to communicate with the first and the second terminals if they are present, the terminal apparatus comprising:
a detector configured to detect a remaining amount of battery power; and
a transmitter configured to insert information regarding the remaining amount of battery power into a signal to be transmitted to the server apparatus, to transmit the information when the server apparatus periodically confirms the presence of the first terminal.

9. The communication system of claim 1, wherein the controller is configured to transmit signals to the first terminal at intervals of the second period of time, and wherein the first terminal is configured to respond to the signals with at least an indication of its remaining battery power, and wherein the controller is configured to adjust the second period of time based upon the indication of the remaining battery power of the first terminal.

10. The communication system of claim 1, wherein the first communication network is a mobile communication network.

11. The server apparatus of claim 7, wherein the controller is configured to transmit signals to the first terminal at intervals of the second period of time, to receive an indication of the remaining battery power of the first terminal in response to the signals, and to adjust the second period of time based upon the indication of the remaining battery power of the first terminal.

12. The terminal apparatus of claim 8, wherein the terminal apparatus is configured to respond to signals transmitted from the server apparatus at intervals of the second period of time with at least an indication of the remaining battery power of the terminal apparatus so as to enable the server apparatus to adjust the second period of time based upon the indication of the remaining battery power of the terminal apparatus.

* * * * *